Nov. 11, 1952  W. J. O'BRIEN  2,617,225
METHOD OF SANDBLASTING
Filed March 23, 1950

Inventor
William J. O'Brien
By Rockwell & Bartholow
Attorneys

Patented Nov. 11, 1952

2,617,225

UNITED STATES PATENT OFFICE 2,617,225

METHOD OF SANDBLASTING

William J. O'Brien, Waterbury, Conn., assignor to The Seamless Rubber Company, New Haven, Conn., a corporation of Connecticut Application March 23, 1950, Serial No. 151,358

3 Claims. (Cl. 41—39)

This invention relates to sandblast stencils, and more particularly to those employing a composition including rubber and used for the ornamenting, cutting or carving of stone by a sandblasting process.

I have previously provided an improved stencil sheet having an unvulcanized body comprising a substantial amount of devulcanized rubber reclaim, a certain amount of factice, and a reinforcement and filler of non-viscid material, substantially unaffected by temperature changes, composed in part of whiting and in part of metal oxides or like material. Such a stencil sheet body has numerous advantages when used for the purpose above stated.

One of the objects of the present invention is to provide an improved sandblast stencil in which a rubber body, such as mentioned above, is employed.

One of the objects is to increase the abrasion resistance of the stencil to a marked degree without, however, offsetting the advantages provided by the use of a stencil body of the character above mentioned.

Another object is to increase the usefulness and also the durability and longevity of the stencil, and greatly to increase the tack life of the adhesive mass.

Another object is to provide in a stencil for the stated purpose a maximum number of advantageous characteristics.

Figure 1:
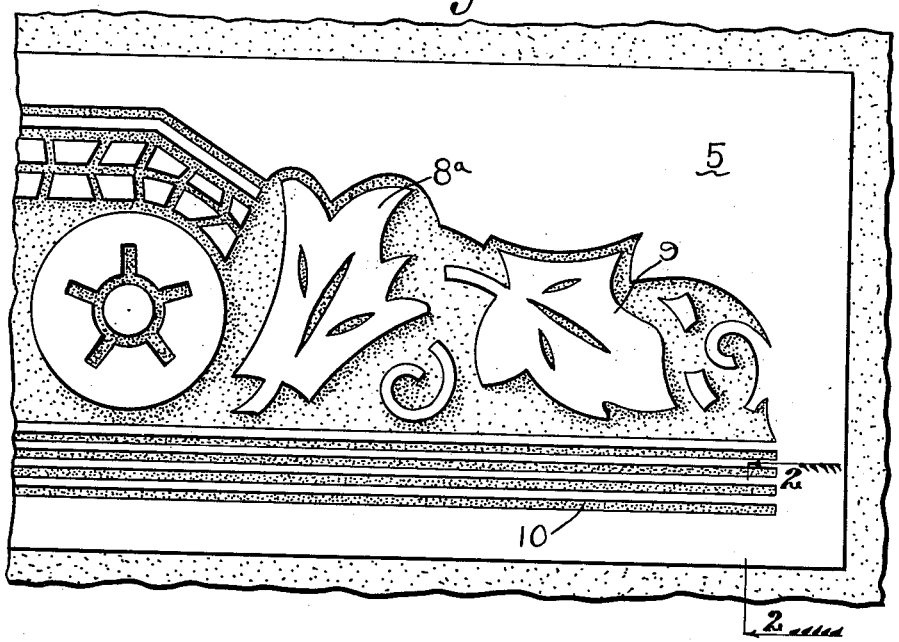
Fig. 1 is a fragmentary elevation showing a cut stencil applied to a stone surface.
Figure 2:
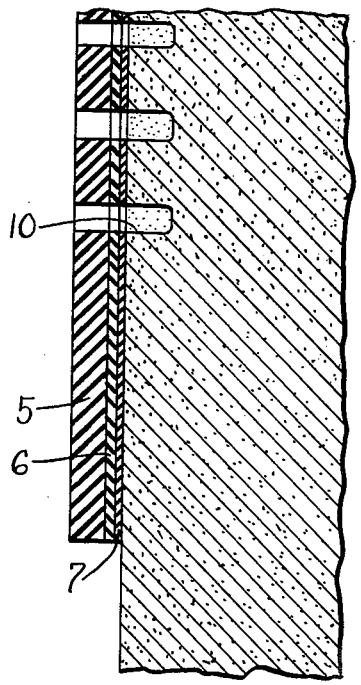
Fig. 2 is an enlarged view on line 2—2 of Fig. 1.
Figure 3:
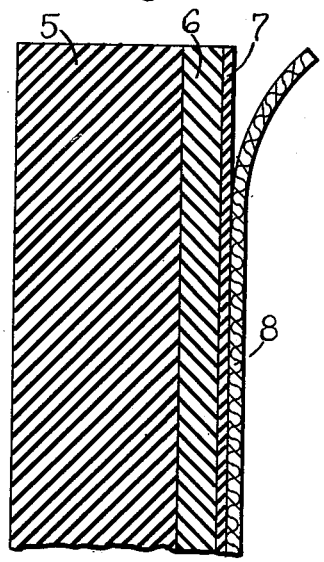
Fig. 3 is an enlarged sectional view of a portion of the stencil.

The stencil of the present invention comprises, in the example shown, a sand-resistant flexible conforming unvulcanized body 5 of the character hereinafter stated; a protective layer or lamina 6 applied to one face of the body; an adhesive layer or mass 7 applied to the exposed face of the protective lamina; and a cover sheet 8 of glazed holland or crinoline which is affixed to the adhesive mass or layer 7.

The body 5 is preferably an unvulcanized body comprising a substantial amount of devulcanized rubber reclaim, a certain amount of factice, and a reinforcement and filler of non-viscid material, substantially unaffected by temperature changes, composed in part of whiting and in part of metal oxides or like material. The devulcanized rubber reclaim (soft rubber) may contain, for example, from 50% to 65% rubber, the remainder being inert filling. The whiting may be in an amount approximating that of the reclaimed rubber by weight. The remainder is supplied by the factice and the metal oxide component, and the metal oxide component may comprise, at least in part, zinc oxide.

The rubber is of course devulcanized in the reclaiming process, and in reclaiming as usually practiced there are added certain oils and other substances which soften the rubber and render it more workable. I use reclaimed rubber as a base because of its inertness to atmospheric changes and changes in temperature, and its ability to blend with the other ingredients named without imparting too much liveliness to the sheet. The whiting is used for imparting smoothness of texture and for making the sheet easier to cut. The factice improves the abrasive-resisting qualities of the stock and gives the stock a certain desirable deadness.

The compound when blended presents a homogeneous and uniform material in which all of the ingredients are combined for the purpose of imparting to the stencil body the most desirable physical characteristics, and meeting all of the numerous conditions required for the ornamenting of stone by sandblasting through a cut stencil. The resulting material, because of its stability, can be used satisfactorily both at relatively high and relatively low temperatures, is easy to cut, will stand high abrasion, will not distort except under severe strain, and from the standpoint of its use is of good color and ageing qualities. This body is extremely flexible in the winter months as well as in the summer, and need not be prepared by heating when the weather is cold.

Due to the flexibility and workability of the sheet or body, sections which are cut out of the same when used for so-called carving can be replaced with greater ease in recessed or concave surfaces. In the drawing, such cut-out sections are indicated, for example, in Fig. 1 at 8ª and 9. The drawing also shows a number of narrow slots 10 cut in the sheet by the use of a knife. The material is so stable and so free cutting that these slots may be easily cut, and after they have been cut the edge portions of the slots will not creep or move away from each other. In cutting the sheet, it is a point of distinct importance that the rubber is not in vulcanized condition, because unvulcanized rubber is much easier to cut, particularly along curved lines.

The lamina or layer 6 is a protective sheet which affords greater protection and abrasion resistance when the sand is being blasted through cut-away portions of the stencil. This protective sheet is, therefore, one which has high resistance to abrasion, or, in other words, a quality of relative hardness and imperviousness without, however, detracting from the required flexibility and conformity of the stencil, and without increasing to an appreciable degree the resistance to the cutting away of the stencil by a cutting knife. This protective sheet is preferably constituted by or comprises uncured rubber of an especially dense and resistant kind. Preferably I use synthetic rubber which is a copolymer of butadiene and styrene, known as GRS, in which the proportion of styrene is relatively high, viz., from 62% to 85%, the remainder being butadiene. This material is admirably suited to the purposes in view.

The uncured synthetic rubber may, for example, be GRS having 70% of styrene and 30% of butadiene, of a molecular weight between 80,000 and 100,000, having a plasticity of 60 Mooney at a temperature of 250° F.

Another suitable GRS rubber is one composed of 75% styrene and 25% butadiene, having a Mooney value of 65. A GRS rubber having more than 85% styrene is too stiff for the contemplated use, and on the other hand one having a stryene content of less than 62% will not have the desired density and close grouping of the molecules which is necessary.

In making the stencil the protective sheet usually is adhered to the rubber body by calendering under heat, with or without the use of a thin layer of a suitable adhesive. Where a special adhesive is not used the firm adhesion between the two layers in question can be effected by mixing a certain amount of relatively soft uncured rubber and filler with the GRS. As one example of this, the composition of the protective sheet or intermediate layer may be as follows:

|  | Per cent |
|---|---|
| GRS of 70% styrene and 30% butadiene | 70.0 |
| Rubber reclaim | 12.0 |
| Filler | 18.0 |
|  | 100.0 |

Another example is as follows:

|  | Per cent |
|---|---|
| GRS of 75% styrene and 25% butadiene | 65.0 |
| Rubber reclaim | 10.0 |
| Metal oxides | 17.0 |
| Factice | 8.0 |
|  | 100.0 |

The GRS is, as above indicated, usually a major component and the reclaim and filler respectively are minor components of the intermediate layer. The filler mentioned in the first example above may be constituted by suitable mixtures of metal oxides.

It will be seen that in all these cases the protective layer 6 is inert in relation to the body 5. It is devoid of substances such as resins or softeners which could migrate to the body 5 and have an effect thereon which detracts from the properties and functions of said body as herein described. The rubber of the layer 6 is entirely compatible with that of the layer 5, and the layer 6 or components thereof will not act to soften or degrade the layer 5.

The protective intermediate sheet is preferably quite thin in comparison to the rubber body 5 to which it is applied. Where, for example, the thickness of the body 5 is approximately .035 of an inch, the protective sheet may have a thickness of .008 of an inch. When constituted as above described, a thin sheet will suffice for the purposes in view. Inasmuch as this sheet is considerably harder than the rubber body 5, the cutting of the stencil would be rendered more difficult if the protective sheet were too thick, but when used in a thin sheet no difficulty on this score is encountered.

The protective sheet has directly applied to it the adhesive layer or mass 7, which is also in a relatively thin layer. The adhesive may comprise natural rubber, zinc oxide, and a suitable resin, together with minor ingredients, or it may be of the kind described in my Patent No. 2,451,865 of October 19, 1948. Such an adhesive in a thin layer serves as a satisfactory adhesive for applying the stencil layers 5 and 6 to the surface of the stone to be cut.

Over the adhesive layer 7 is applied the cover sheet 8, which protects the adhesive until such time as the stencil is to be applied to the stone surface.

When the stencil is applied to the stone, the intermediate sheet or layer 6 serves several important functions. The stone is always at a lower temperature than the surrounding air, and this layer is considerably stiffened in a short time by the withdrawal of heat to the stone, and in this way the adhesive mass is more closely held to the cut in the stone, so that the design of the stencil can be transferred more accurately to the work. The intermediate layer also receives the direct action of the sand around the stencil opening, and due to its hardness gives more abrasion resistance than would be offered if the rubber body 5 had the adhesive applied directly to it, as in my previous stencil. The increased abrasion resistance around the inner end portion of the opening cut in the stencil is an important feature, as it prevents or inhibits the formation of a rounded edge around the opening cut in the stone, which is very objectionable. It also makes the stencil last longer. In cutting a hard stone like granite, for example, an air pressure of 100 pounds or more per inch is frequently used in sandblasting, and under such severe conditions it has been difficult to make the work accurate, and the stencils have been short lived. By the present improvement, the existing conditions of use are met in a satisfactory manner. A higher pressure of air can be used than otherwise, and the work will be more accurate.

A still further function carried out by the intermediate layer is the preservation of the characteristics of the adhesive mass, because of the fact that the tackifying component of the mass is prevented from being absorbed into the rubber body 5. The intermediate layer is denser and of a lower order of solubility than the body 5, and its function is to prevent the resin or other tacky component or tackifier of the mass from migrating to the rubber body by interposing a protective separating or blocking member. Where the intermediate layer is a mixture of GRS, rubber reclaim and filler, with or without factice, as in the examples previously described, the composition of the layer is of such character that on the one hand there is satisfactory adhesion between the layer and the body 5 and on the other hand negligible absorption of the tackifying substances of the adhesive into the intermediate layer. Notwithstanding the use of a certain amount of reclaim in a mixture with the GRS, the intermediate layer acts as an effective blocking member to prevent the tackifying substance or substances of the adhesive from migrating or passing over into the layer which serves as the stencil body or main stencil portion. As a result the adhesive layer is maintained for a long period in its initial active pressure-sensitive condition.

I may use either natural or synthetic rubber reclaim, and where the term "rubber" is used it is employed in a broad and general sense.

Various changes and modifications may be made in the stencil herein described without departure from the invention or the scope of the claims.

What I claim is:

1. The method of stencil sand-blasting for producing cut designs upon stone and like surfaces, which consists in the use of a stencil sheet of a sand-resistant flexible conforming body together with a protective layer adhered to the conforming body and including uncured rubber more dense and sand resistant than the conforming body, and wherein the protective layer is adhesively applied directly to the surface which is to receive the cut design, the protective layer being of such characteristics as to provide increased abrasion resistance directly around the inner end portion of the opening cut in the stencil sheet to thus receive the direct action of the sand blast around the stencil opening.

2. The method of stencil sand-blasting for producing cut designs upon stone and like surfaces, which consists in the use of a stencil sheet comprising a sand-resistant flexible conforming body or layer, a protective layer adhered to one face of the said conforming body including uncured rubber more dense and sand resistant than the conforming body, and a layer of adhesive containing a tackifying component applied to the external face of said protective layer, and wherein the adhesive layer serves to affix the stencil sheet to the surface to be sand-blasted and with the protective layer adjacent said surface which is to receive the cut design by sand-blasting, said protective layer being dense and non-absorptive so as to prevent migration of said tackifier to said conforming body.

3. The method of stencil sand-blasting for producing cut designs upon stone and like surfaces, which consists in the use of a stencil sheet comprising a sand-resistant flexible conforming body or layer of compounded non-viscid material of unvulcanized rubber and factice, a protective layer adhered to one face of the said conforming body including uncured rubber more dense and sand resistant than the rubber of the conforming body, and a layer of adhesive containing a tackifier applied to the external face of said protective layer, and wherein the adhesive layer serves to affix the stencil sheet to the surface to be sandblasted and with the protective layer adjacent said surface which is to receive the cut design by sandblasting, said protective layer being of such characteristics and so positioned with reference to the surface to be sandblasted as to provide increased abrasion resistance directly around the inner end portion of the opening cut in the stencil sheet to thus receive the direct action of the sand blast around the stencil opening, and with said protective layer also serving to prevent migration of the tackifying constituent to said conforming body.

WILLIAM J. O'BRIEN.

REFERENCES CITED

The following references are of record in the file of this patent:

UNITED STATES PATENTS

| Number | Name | Date |
| --- | --- | --- |
| 2,270,945 | Frick | Jan. 27, 1942 |
| 2,393,668 | Wartha | Jan. 29, 1946 |